United States Patent
Barschdorf et al.

(10) Patent No.: US 8,233,691 B2
(45) Date of Patent: Jul. 31, 2012

(54) REDUCTION OF HEART MOTION ARTIFACTS IN THORACIC CT IMAGING

(75) Inventors: Hans Barschdorf, Dassendorf (DE); Jens Von Berg, Hamburg (DE); Michael Harald Kuhn, Hamburg (DE); Cristian Lorenz, Hamburg (DE); Thomas Blaffert, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 491 days.

(21) Appl. No.: 12/438,952

(22) PCT Filed: Aug. 27, 2007

(86) PCT No.: PCT/IB2007/053403
§ 371 (c)(1),
(2), (4) Date: Feb. 26, 2009

(87) PCT Pub. No.: WO2008/026141
PCT Pub. Date: Mar. 6, 2008

(65) Prior Publication Data
US 2010/0014736 A1    Jan. 21, 2010

(30) Foreign Application Priority Data
Aug. 29, 2006    (EP) ...................... 06119663

(51) Int. Cl.
*G06K 9/00* (2006.01)
(52) U.S. Cl. .......................................... 382/131
(58) Field of Classification Search .................. None
See application file for complete search history.

(56) References Cited

U.S. PATENT DOCUMENTS

| | | | |
|---|---|---|---|
| 6,496,601 B1 * | 12/2002 | Migdal et al. | 382/239 |
| 6,982,710 B2 * | 1/2006 | Salomie | 345/420 |
| 7,538,764 B2 * | 5/2009 | Salomie | 345/420 |
| 2005/0069081 A1 | 3/2005 | Kokubun et al. | |
| 2005/0226485 A1 | 10/2005 | Boese | |
| 2005/0226527 A1 | 10/2005 | Weese et al. | |
| 2006/0002601 A1 | 1/2006 | Fu et al. | |
| 2006/0120586 A1 | 6/2006 | Iatrou et al. | |

OTHER PUBLICATIONS

Manke et al, "Model Evaluation and Calibration for Prospective Respiratory Motion Correction in Coronary MR Angiography Based on 3-D Image Registration", IEEE Transactions on Mdeical Imaging, vol. 21, No. 9, Sep. 2002, pp. 1132-1141.
Krol et al, "Iterative Finite Element Deformable Model for Nonrigid Coregistration of Multimodal Breast Images", Biomedical Imaging: Macro to Nano, 2006, pp. 852-855.
Papademetris et al, "Estimation of 3-D Left Ventricular Deformation From Meidcal Images Using Biomechanical Models", IEEE Transactions on Medical Imaging, vol. 21, No. 7, Jul. 2002, pp. 786-800.
Lorenz et al, "A Comprehensive Shape Model of the Heart", Medical Image Analysis, vol. 10, 2006, pp. 657-670.

(Continued)

*Primary Examiner* — Tu Nguyen

(57) ABSTRACT

The invention relates to a system for adapting a plurality of model meshes to a plurality of image data. The system has a registration unit for registering the plurality of model meshes with the plurality of image data on the basis of a computation of a registration transformation for transforming the plurality of model meshes, and an adaptation unit for adapting the plurality of registered model meshes to the plurality of image data on the basis of a computation of locations of mesh vertices of the plurality of model meshes. The described system is capable of reducing motion artifacts in tomographic images computed from data acquired at a plurality of different cardiac cycle phases.

20 Claims, 4 Drawing Sheets

OTHER PUBLICATIONS

Von Berg et al, "Multi-Surface Cardiac Modelling, Segmentation, and Tracking", Functional Imaging and Modeling of the Heaert, vol. 3504, Jun. 10, 2005, p. 1-11.

I.L. Dryden et al, Statistical Shape Analysis, John Wiley & Sons, Chichester, UK 1998, Chapters 3 and 5.

Jens Von Berg et al, "Multi-Surface Cardiac Modelling, Segmentation, and Tracking", FIMH, Proceeding of the Third International Workshop, pp. 1-11, 2005.

Jurgen Weese et al, "Shape Constrained Deformable Modesl for 3D Medical Image Segmentation", Proc. IPMI, Springer 2001, pp. 380-387.

Pierre Grangeat et al, "Theoretical Framework for a Dynamic Cone-Beam Reconstruction Algorithm Based on a Dynamic Particle Model", Physics in Medicine and Biology, vol. 47, 2002, p. 2611-2625.

Fred L. Bookstein, "Principal Warps: Thin-Plate Splines and the Decomposition of Deformations", IEEE Transactions on Pattern Analysis and Machine Intelligence, vol. 11, 1989, pp. 567-585.

Joey A. Kimdon et al, "Motion Estimation and Compensation in Dynamic Spiral CT Reconstruction", Nuclear Science Symposium Conference Record, IEEE, vol. 7, Oct. 2004, pp. 16-22.

Michael R. Kaus et al, "Automated 3-D PDM Construction From Segmented Images Using Deformable Models", IEEE Transactions on Medical Imaging, vol. 22, No. 8, 2003, p. 1005-1013.

O. Ecabert et al, "Towards Automatic Fullheart Segmentation in Computed-Tomography Images", Computers in Cardiology, 2005, pp. 223-226.

* cited by examiner

REDUCTION OF HEART MOTION ARTIFACTS IN THORACIC CT IMAGING

FIELD OF THE INVENTION

The invention relates to the field of medical imaging of an anatomical structure and more specifically to the imaging of moving internal tissue such as cardiac tissue.

BACKGROUND OF THE INVENTION

Typically thorax image data acquisition occurs in an inhaled or in an exhaled state. The patients hold their breath for the duration of the thorax scan, which prevents breathing motion artifacts, but still the heart is beating. The heart motion results in inconsistencies within the set of projections from which a CT scan is reconstructed. This results in motion artifacts such as tissue dislocation, blurring, and spurious edges. A method of imaging moving tissue is described in US 2005/0069081 entitled "Method for Tracking Motion Phase of an Object for Correcting Organ Motion Artifacts in X-Ray CT". This document describes a method of tracking the motion phase of an object such as a heart. Within the diastole phase of a cardiac cycle there is less motion of the heart than in the rest of the cardiac cycle. The described method of tracking the motion phase of an object identifies the projection data acquired during the diastolic phase of the cardiac cycle. Once these projections have been identified, they are used in the tomographic image reconstruction process, producing images substantially free of cardiac motion artifacts. If this method is to be used, however, the data acquisition time must extend over a plurality of diastolic phases, i.e. over a plurality of cardiac cycles, thus requiring an extended data acquisition time. Holding the breath during the extended data acquisition time may be inconvenient or sometimes impossible for a patient.

SUMMARY OF THE INVENTION

It would be advantageous to have a system that is capable of reducing motion artifacts in tomographic images computed from data acquired over a plurality of different phases of a cardiac cycle.

To better address this concern, in an aspect of the invention, a system for adapting a first model mesh to first image data and for adapting a second model mesh to second image data comprises:

a registration unit for registering the first model mesh with the first image data and for registering the second model mesh with the second image data on the basis of a computation of a registration transformation for transforming the first model mesh and for transforming the second model mesh; and an adaptation unit for adapting the registered first model mesh to the first image data on the basis of a computation of locations of vertices of the first model mesh and for adapting the registered second model mesh to the second image data on the basis of a computation of locations of vertices of the second model mesh, thereby adapting the first model mesh to the first image data and adapting the second model mesh to the second image data.

The first model mesh and the second model mesh may describe an anatomical shape at two distinct phases of motion, for example the human heart at a first cardiac cycle phase and at a second cardiac cycle phase. Both model meshes have the same mesh topology. A method of constructing a sequence of model meshes in a model space, the sequence describing the human heart at different cardiac-cycle-phases, is described in an article "Multi-surface cardiac Modeling, Segmentation, and Tracking" by J. von Berg and C. Lorenz, published in FIMH, Proceeding of the Third international Workshop, pages 1-11, Springer 2005, hereinafter referred to as Ref. 1.

The registration unit of the system is arranged to register the first model mesh with the first image data and to register the second model mesh with the second image data. The registration is carried out by a registration transformation, e.g. a similarity transformation, of a model space into an image data space. The same registration transformation is used for transforming the first model mesh and for transforming the second model mesh. The registration transformation is based on a a cost function optimization. For example, the computed registration transformation may correspond to a minimum of the cost function. The computed registration transformation is used for transforming the first model mesh and the second model mesh.

The adaptation unit of the system is arranged to adapt the registered first model mesh to the first image data and to adapt the registered second model mesh to the second image data. The locations of vertices of the registered first model mesh and of vertices of the registered second model mesh are computed from a a cost function optimization. For example, the computed locations of vertices of the adapted first model mesh and of the adapted second model mesh may correspond to a minimum of the cost function.

The first image data may comprise a first set of slices of thoracic CT data acquired at a first cardiac-cycle-phase and the second image data may comprise a second set of slices of thoracic CT data acquired at a second cardiac-cycle-phase. The adapted first model mesh and the adapted second model mesh may be used to construct a vector field required for a motion-compensated reconstruction of image data. The described system for adapting the first model mesh to the first image data and for adapting the second model mesh to the second image data is thus capable of reducing motion artifacts in tomographic images computed from data acquired at a plurality of different phases of the cardiac cycle.

A further advantage offered by the system is an improved system for adapting a topological model mesh of a predetermined topology to the first image data and to the second image data, e.g. for modeling cardiac motion of an individual human heart on the basis of data acquired at a plurality of different phases of a cardiac cycle. The adapted first model mesh and the adapted second model mesh used by the system are useful geometrical instances of the topological model mesh describing the individual human heart at two different phases of the cardiac cycle.

The advantageous properties of the system are due to built-in information on cardiac motion comprised in a motion model comprising the first model mesh for modeling the heart at the first cardiac-cycle-phase and the second model mesh for modeling the heart at the second cardiac-cycle-phase.

In an embodiment of the system, the system further comprises a computation unit for computing a sparse vector field comprising vectors of displacements of vertices of the adapted second model mesh relative to respective vertices of the adapted first model mesh. The sparse vector field comprises useful information on a relationship between two objects such as surfaces of anatomical structures modeled by the model meshes. For example, the sparse vector field describes how to transform a second object modeled by the second model mesh into a first object modeled by the first model mesh.

In an embodiment of the system, the system further comprises an approximation unit for computing a dense vector field comprising vectors of displacements of locations comprised in the second image data relative to respective locations comprised in the first image data and based on the sparse vector field. For example, the approximation unit may be arranged to interpolate the sparse vector field using thin-plate splines. Constructing the dense vector field using the thin-plate spline interpolation of the sparse vector field is described in an article by F. L. Bookstein entitled "Principal warps: Thin-plate splines and the decomposition of deformations" in IEEE Transactions on Pattern Analysis and Machine Intelligence, Vol. 11, pages 567-585, 1989. Constructing the dense vector field comprising vectors of displacements of locations comprised in the second image data relative to respective locations comprised in the first image data renders it possible to transform any object comprised in the second image data into a respective object in the first image data.

In an embodiment of the system, the system further comprises a merge unit for merging the second image data with the first image data using the dense vector field, thereby creating merged image data. The first image data may comprise data comprised in thoracic CT slices acquired at a first cardiac cycle-phase and the second data may comprise data comprised in thoracic CT slices acquired at a second cardiac cycle phase. The merged image data comprise data from the first image data and data from the transformed second image data, said transformed second image data comprising second image data transformed with the use of the dense vector field. While the second image data comprise data acquired at a second cardiac cycle-phase, the transformed second image data approximate the second image data at the first cardiac cycle-phase. Thus a view of the merged image data comprises fewer motion artifacts than a view of the image data merged without using the dense vector field for compensating motion artifacts. The heart motion compensation has many useful applications. For example, the heart motion compensation enhances the visibility of lung nodules located close to the heart.

In an embodiment of the system, the system further comprises a reconstruction unit for reconstructing motion-compensated image data using the dense vector field. A suitable method for reconstructing the motion-compensated image data using the dense vector field within the filtered back-projection is described in an article by P. Grangeat et al. entitled "Theoretical framework for a dynamic cone-beam reconstruction algorithm based on a dynamic particle model" in Physics in Medicine and Biology Vol. 47, pages 2611-2625, 2002, for cone-beam reconstruction in circular X-ray CT, and in an article by J. A. Kimdon et al. entitled "Motion Estimation and Compensation in Dynamic Spiral CT Reconstruction" in Nuclear Science Symposium Conference Record, IEEE, Volume 7, 16-22 Oct. 2004, pages 4204-4206, for cone-beam reconstruction in spiral X-ray CT. Views computed from the motion-compensated image data have their motion artifacts further reduced. Alternatively, the dense vector field may be applied to reconstruct motion-compensated image data using a different reconstruction algorithm, e.g. an algebraic reconstruction algorithm.

In an embodiment of the system, the first model mesh is a first heart model mesh at a first cardiac cycle phase and the second model mesh is a second heart model mesh at a second cardiac cycle phase. This embodiment describes a useful application of the system. Here the system may be used for modeling cardiac motion and/or for reducing motion artifacts in images computed from the image data set.

In an embodiment of the system, the registration transformation is an affine transformation. Affine transformations have a number of advantages: they are easy to implement, fast to compute, and offer 12 degrees of freedom, i.e. almost twice as many as the similarity transformations, which offer 7 degrees of freedom.

In a further aspect of the invention, an image acquisition apparatus comprises a system for adapting a first model mesh to first image data and for adapting a second model mesh to second image data, the system comprising:

a registration unit for registering the first model mesh with the first image data and for registering the second model mesh with the second image data on the basis of a computation of a registration transformation for transforming the first model mesh and for transforming the second model mesh; and an adaptation unit for adapting the registered first model mesh to the first image data on the basis of a computation of locations of vertices of the first model mesh and for adapting the registered second model mesh to the second image data on the basis of a computation of locations of vertices of the second model mesh, thereby adapting the first model mesh to the first image data and adapting the second model mesh to the second image data.

In a further aspect of the invention, a workstation comprises a system for adapting a first model mesh to first image data and for adapting a second model mesh to second image data, the system comprising:

a registration unit for registering the first model mesh with the first image data and for registering the second model mesh with the second image data on the basis of a computation of a registration transformation for transforming the first model mesh and for transforming the second model mesh; and an adaptation unit for adapting the registered first model mesh to the first image data on the basis of a computation of locations of vertices of the first model mesh and for adapting the registered second model mesh to the second image data on the basis of a computation of locations of vertices of the second model mesh, thereby adapting the first model mesh to the first image data and adapting the second model mesh to the second image data.

In a further aspect of the invention, a method of adapting a first model mesh to first image data and a second model mesh to second image data comprises:

a registration step for registering the first model mesh with the first image data and for registering the second model mesh with the second image data on the basis of a computation of a registration transformation for transforming the first model mesh and for transforming the second model mesh; and an adaptation step for adapting the registered first model mesh to the first image data on the basis of a computation of locations of vertices of the first model mesh and for adapting the registered second model mesh to the second image data on the basis of a computation of locations of vertices of the second model mesh, thereby adapting the first model mesh to the first image data and adapting the second model mesh to the second image data.

In a further aspect of the invention, a computer program product to be loaded by a computer arrangement comprises instructions for adapting a first model mesh to first image data and for adapting a second model mesh to second image data, the computer arrangement comprising a processing unit and a memory, the computer program product, after being loaded, providing said processing unit with the capability to carry out the following tasks of:

registering the first model mesh with the first image data and for registering the second model mesh with the second image data on the basis of a computation of a registration transformation for transforming the first model mesh and for transforming the second model mesh; and adapting the registered first model mesh to the first image data on the basis of a computation of locations of vertices of the first model mesh and for adapting the registered second model mesh to the second image data on the basis of a computation of locations of vertices of the second model mesh, thereby adapting the first model mesh to the first image data and adapting the second model mesh to the second image data.

Modifications and variations of the image acquisition apparatus, of the workstation, of the method, and/or of the computer program product which correspond to modifications of the system and variations thereof as described above may be carried out by a skilled person on the basis of the present description.

The skilled person will appreciate that the method may be applied to three-dimensional (3D) image data and four-dimensional (4D) time-dependent image data acquired by various acquisition modalities such as, but not limited to, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

The same reference numerals are used to denote similar parts throughout the Figures.

DETAILED DESCRIPTION OF EMBODIMENTS

Figure 1:
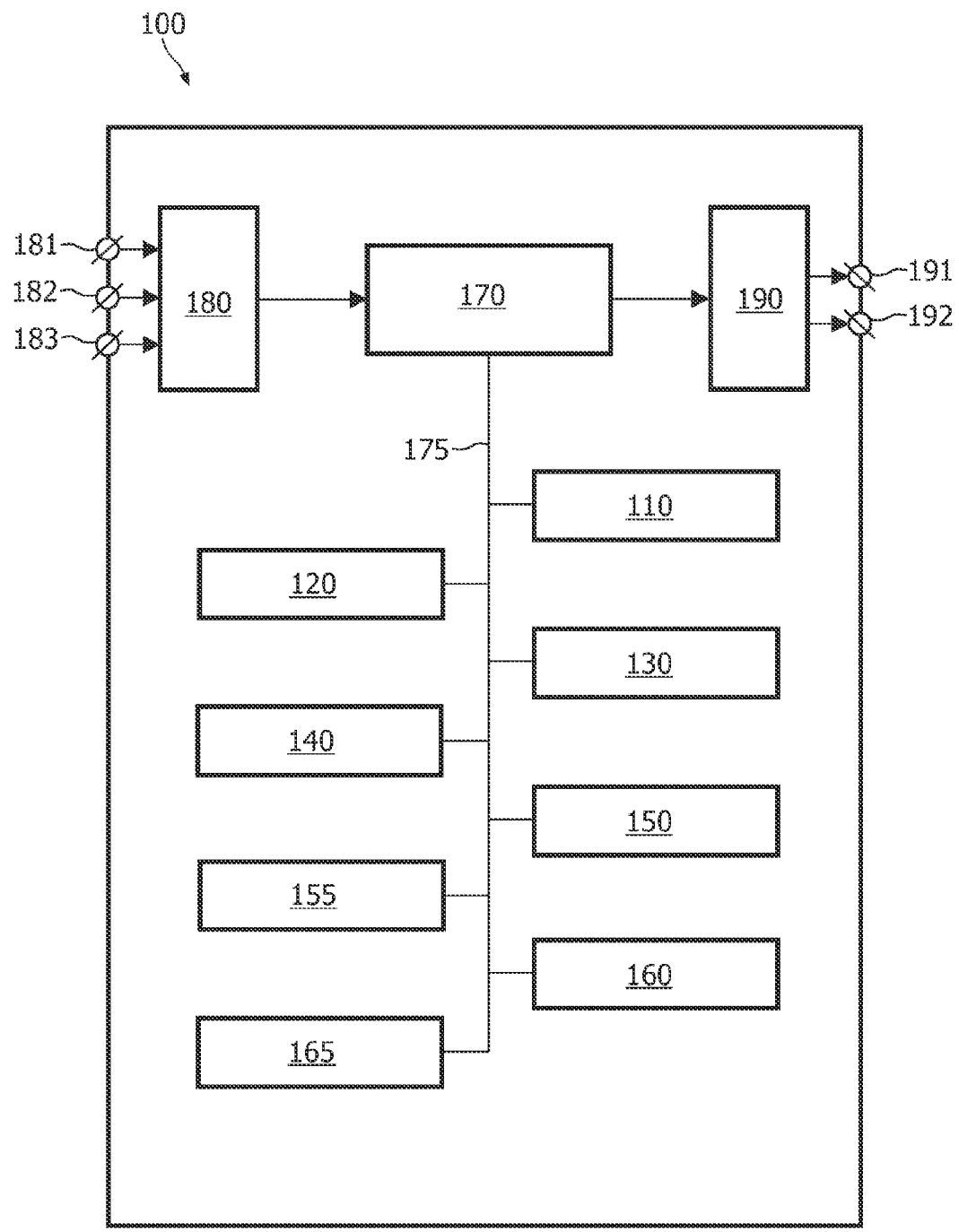
FIG. 1 is a block diagram of an exemplary embodiment of the system.

FIG. 1 is a block diagram of an exemplary embodiment of the system for adapting a first model mesh to first image data and for adapting a second model mesh to second image data, the system comprising:

a registration unit 110 for registering the first model mesh with the first image data and for registering the second model mesh with the second image data on the basis of a computation of a registration transformation for transforming the first model mesh and for transforming the second model mesh; and an adaptation unit 120 for adapting the registered first model mesh to the first image data on the basis of a computation of locations of vertices of the first model mesh and for adapting the registered second model mesh to the second image data on the basis of a computation of locations of vertices of the second model mesh.

The exemplary embodiment of the system 100 further comprises the following optional units:

a computation unit 130 for computing a sparse vector field comprising vectors of displacements of vertices of the adapted second model mesh relative to respective vertices of the adapted first model mesh;

an approximation unit 140 for computing a dense vector field comprising vectors of displacements of locations comprised in the second image data relative to respective locations comprised in the first image data and based on the sparse vector field;

a merge unit 150 for merging the second image data with the first image data using the dense vector field;

a reconstruction unit 155 for reconstructing motion-compensated image data using the dense vector field;

a control unit 160 for controlling the workflow in the system 100;

a user interface 165 for communicating with a user of the system 100; and a memory unit 170 for storing data.

In the exemplary embodiment of the system 100, there are three input connectors 181, 182, and 183 for the incoming data. The first input connector 181 is arranged to receive data coming in from data storage such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182, and 183 are connected to an input control unit 180.

In the exemplary embodiment of the system 100 there are two output connectors 191 and 192 for the outgoing data. The first output connector 191 is arranged to output the data to data storage such as a hard disk, a magnetic tape, a flash memory, or an optical disk. The second output connector 192 is arranged to output the data to a display device. The output connectors 191 and 192 receive the respective data via an output control unit 190.

The skilled person will understand that there are many ways to connect input devices to the input connectors 181, 182, and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In the exemplary embodiment of the system 100, the system 100 comprises a memory unit 170. The system 100 is arranged to receive input data from external devices via any of the input connectors 181, 182, and 183 and to store the received input data in the memory unit 170. Loading of the input data into the memory unit 170 affords the units of the system 100 a quick access to relevant data portions. The input data may comprise, for example, the first image data and the second image data. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data may comprise, for example, the adapted first model mesh and the adapted second mesh model. The memory unit 170 is also arranged to receive data from and to deliver data to the units of the system 100, comprising the registration unit 110, the adaptation unit 120, the computation unit 130, the approximation unit 140, the merge unit 150, the reconstruction unit 155, the control unit 160, and the user interface 165, via a memory bus 175. The memory unit 170 is further arranged to make the output data available to external devices via any of the output connectors 191 and 192. Storage of the data originating from the units of the system 100 in the memory unit 170 may advantageously improve the performance of the units of the system 100 as well as the rate of transfer of the output data from the units of the system 100 to external devices.

Alternatively, the system 100 may not comprise the memory unit 170 and the memory bus 175. The input data used by the system 100 may be supplied by at least one external device, such as an external memory or a processor, connected to the units of the system 100. Similarly, the output data produced by the system 100 may be supplied to at least one external device, such as an external memory or a processor, connected to the units of the system 100. The units of the system 100 may be arranged to receive the data from each other via internal connections or via a data bus.

In the exemplary embodiment of the system 100 shown in FIG. 1, the system 100 comprises a control unit 160 for controlling the workflow in the system 100. The control unit may be arranged to receive control data from and to provide control data to the units of the system 100. For example, after registering the first model mesh and the second model mesh, the registration unit 110 may be arranged to provide a control data item "the registration has been completed" to the control unit 160, and the control unit 160 may be arranged to provide further control data "start adapting the first model mesh and the second model mesh" to the adaptation unit 120. Alternatively, a control function may be implemented in another unit of the system 100.

In the exemplary embodiment of the system 100 shown in FIG. 1, the system 100 comprises a user interface 165 for communicating with the user of the system 100. The user interface 165 may be arranged to prompt the user for an input and to accept a user input for specifying a file comprising an image data set comprising the first image data and the second image data, for example. The user interface 165 may further provide the user with an insight into the progress of the adaptation, e.g. by displaying the registered first model mesh and the registered second model mesh. Optionally, the user interface may receive a user input for selecting a mode of operation of the system 100, such as a mode for selecting a cost function to be used by the registration unit and/or by the adaptation unit. The skilled person will understand that more functions may be advantageously implemented in the user interface 165 of the system 100.

Optionally, in a further embodiment of the system 100, the system 100 may comprise an input device such as a mouse or a keyboard and/or an output device such as a display. The skilled person will understand that there is a wide variety of input and output devices that can be advantageously comprised in the system 100.

The system 100 of the invention will be explained with reference to its application to the modeling of cardiac shape and motion in a multiphase CT image data set. However, the skilled person will understand that the system 100 is applicable to other imaging modalities, e.g. to MRI, which scan the thorax sequentially, thus causing motion artifacts when the temporally acquired image data are combined. The described embodiments should not be construed as limiting the scope of the claims.

In an embodiment, the first model mesh is a mesh for modeling the "mean" heart of adult humans at a first cardiac cycle phase and the second model mesh is a mesh for modeling the "mean" heart of adult humans at a second cardiac cycle phase. The first model mesh may be constructed using Procrustes analysis and/or principal component analysis (PCA) of a plurality of meshes describing a plurality of hearts of a plurality of adult humans. Procrustes analysis and PCA are described in a book by I. L. Dryden and K. V. Mardia entitled "Statistical Shape Analysis", John Wiley & Sons; Chichester, UK, 1998. Each mesh from the plurality of meshes may be obtained by adapting a mesh to a training image from a plurality of training images, wherein each training image describes a heart of an adult human at the first cardiac cycle-phase. A method of constructing the plurality of meshes from the plurality of training images is described by M. R. Kaus et al. in an article entitled "Automated 3-D PDM Construction From Segmented Image Using Deformable Models" in IEEE Transactions on Medical Imaging, vol. 22, no. 8, pages 1005-1013, 2003. The second model mesh for modeling the heart at a second cardiac cycle phase may be constructed in a similar way. A method for constructing a sequence of model meshes in the model space, the sequence describing the human heart at different cardiac cycle phases, is described in Ref. 1.

The first model mesh and the second model mesh may be described by coordinates, e.g. Cartesian coordinates, of their vertices in a model space coordinate system. The relationship between the first model mesh and the second model mesh may be described by vectors of displacement of vertices of the second model mesh relative to respective vertices of the first model mesh in the model space coordinate system.

The registration unit 110 of the system 100 is arranged to register the first model mesh with the first image data and to register the second model mesh with the second image data. The registration is carried out by means of a registration transformation, e.g. a global transformation such as a rigid transformation, a similarity transformation, or an affine transformation. The same registration transformation is used for transforming the first model mesh and for transforming the second model mesh.

The registration transformation is computed on the basis of a cost function. For example, the cost function may be a total energy function comprising an internal energy term and an external energy term. The internal energy term is arranged to penalize deformations of the registered first model mesh and/or of the registered second model mesh. The external energy term is arranged to penalize displacements of vertices of the registered first model mesh from their respective target locations in the first image data and the displacements of vertices of the registered second model mesh from their respective target locations in the second image data. Constructing an exemplary internal energy term and an exemplary external energy term is described in an article by O. Ecabert et al. entitled "Towards automatic full heart segmentation in computed-tomography images" in Computers in Cardiology, pages 223-226, 2005, hereinafter referred to as Ref. 2, and in more detail in an article by J. Weese et al. entitled "Shape constrained deformable models for 3D medical image segmentation", Proc. IPMI, pp. 380-387, Springer 2001, hereinafter referred to as Ref. 3. The registration is based on varying parameters of the registration transformation to minimize the total energy. The computed registration transformation is used to transform the first model mesh and to transform the second model mesh.

The registration transformation of the first model mesh and of the second model mesh may be defined as a transformation of coordinates of the first model mesh and of the second model mesh in a model mesh space coordinate system. Typically, a candidate registration transformation is selected from a class of transformations. Each transformation is specified by a number of parameters that are allowed to vary within a parameter-specific range. In an embodiment, the registration transformation is a transformation from the class of rigid transformations. Each rigid transformation may be specified by 6 independent parameters. In a further embodiment, the registration transformation may be a transformation from the class of similarity transformations or from the class of affine transformations. Each similarity transformation is specified by 7 parameters and each affine transformation is specified by 12 parameters. In a yet more general embodiment, the registration transformation may be a transformation from the class of piecewise affine transformations. The number of parameters specifying a piecewise affine transformation depends on the partition of the model space into domains of component affine transformations.

The adaptation unit 120 of the system 100 is arranged to adapt the registered first model mesh to the first image data and to adapt the registered second model mesh to the second image data. The locations of vertices of the registered first model mesh and of vertices of the registered second model mesh are computed on the basis of a cost function. For example, the computed locations of vertices of the first model mesh and of vertices of the second model mesh may correspond to a minimum of the cost function. The cost function may be a total energy function comprising an internal energy term and an external energy term. The internal energy term is arranged to penalize deformations of the adapted first model mesh and of the adapted second model mesh. The external energy term is arranged to penalize displacements of vertices of the adapted first model mesh from their respective target locations in the first image data and the displacements of vertices of the adapted second model mesh from their respective target locations in the second image data. Constructing an exemplary internal energy term and an exemplary external energy term and minimizing the total energy is described in Ref. 2 and in Ref. 3. The adaptation is based on varying locations of vertices of the first model mesh and of the second model mesh so as to minimize the total energy.

In an embodiment of the system 100, the system 100 further comprises a computation unit 130 for computing a sparse vector field comprising vectors of displacement of vertices of the adapted second model mesh relative to respective vertices of the adapted first model mesh. In a further embodiment of the system 100, the system 100 further comprises an approximation unit 140 for computing a dense vector field comprising vectors of displacements of locations comprised in the second image data relative to respective locations comprised in the first image data and based on the sparse vector field. For example, the approximation unit may be arranged to interpolate the sparse vector field using thin plate splines. The merge unit 150 or the reconstruction unit 155 may use the dense vector field to reconstruct a motion-compensated image data.

In an embodiment of the system 100, the system 100 further comprises a reconstruction unit 155 for reconstructing motion-compensated image data by using the dense vector field. Reconstructing the motion-compensated image data by means of the dense vector field may be carried out within the filtered back-projection approach. Alternatively, the dense vector field may be applied to reconstruct motion-compensated image data by a different reconstruction algorithm, e.g. an algebraic reconstruction algorithm. The skilled person will understand that the scope of the claims is independent of the reconstruction method used by the reconstruction unit 155.

The skilled person will understand that the system 100 may be applied to an image data set comprising image data acquired at more than two data acquisition times. For each cardiac cycle phase corresponding to an image data acquisition time there are image data comprising a set of slices of thoracic CT scan data acquired at said cardiac cycle phase and a model mesh from a motion model, the model mesh corresponding to said cardiac cycle phase. The registration unit 110 of the system 100 may be arranged to register each model mesh with the corresponding image data on the basis of a computation of a registration transformation for transforming said model mesh. The same registration transformation is applied to each model mesh. The adaptation unit 120 of the system is arranged to adapt each registered model mesh to the respective image data on the basis of a computation of locations of vertices of each model mesh.

Registering and adapting the model meshes may be based on a computation of parameters of the registration transformation and on a computation of model mesh vertex coordinates, respectively, using a cost function. The cost function may be, for example, a total energy function comprising an internal energy term and an external energy term. The internal energy term is arranged to penalize deformations of a registered or of an adapted model mesh. The external energy term is arranged to penalize displacements of vertices of the registered or of the adapted model meshes from their respective target locations in the image data. The same cost function may be used by the registration unit 110 and by the adaptation unit 120. Alternatively, the registration unit 110 and the adaptation unit 120 may use different cost functions.

The internal energy term may depend on vertices of a reference model mesh corresponding to a reference cardiac cycle phase. The reference cardiac cycle phase may be determined from a user input. Alternatively, the internal energy term may depend on vertices of a plurality of model meshes corresponding to a plurality of cardiac cycle phases, possibly on vertices of all model meshes from the set of model meshes. Furthermore, the internal energy term may comprise only intra-mesh vertex interaction terms. Alternatively, the internal energy term may comprise both intra-mesh vertex interaction terms and inter-mesh vertex interaction terms.

The adapted model meshes may be used by the computation unit 130 to compute sparse vector fields and by the approximation unit 140 to compute dense vector fields. The merge unit 150 may be used to merge each subset of image data from the image data set with reference image data using the dense vector field corresponding to the respective image data and the reference image data, thereby creating merged image data. The reconstruction unit 155 may be used for reconstructing motion-compensated image data using the computed dense vector fields.

The skilled person will further understand that other embodiments of the system 100 are also possible. It is possible, among other things, to redefine the units of the system and to redistribute their functions. For example, in an embodiment of the system 100, the functions of the computation unit 130 may be combined with the functions of the approximation unit 140. In a further embodiment of the system 100, there may be a plurality of registration units replacing the registration unit 110. Each registration unit from the plurality of registration units may be arranged to apply a different cost function. The applied cost function may be based on a user selection.

The units of the system 100 may be implemented by a processor. Normally, their functions are performed under the control of a software program product. During execution, the software program product is normally loaded into a memory, like a RAM, and executed from there. The program may be loaded from a background memory, like a ROM, hard disk, magnetic storage, and/or optical storage, or may be loaded via a network such as the Internet. Optionally, an integrated circuit specific to the application may provide the described functionality.

Figure 2:
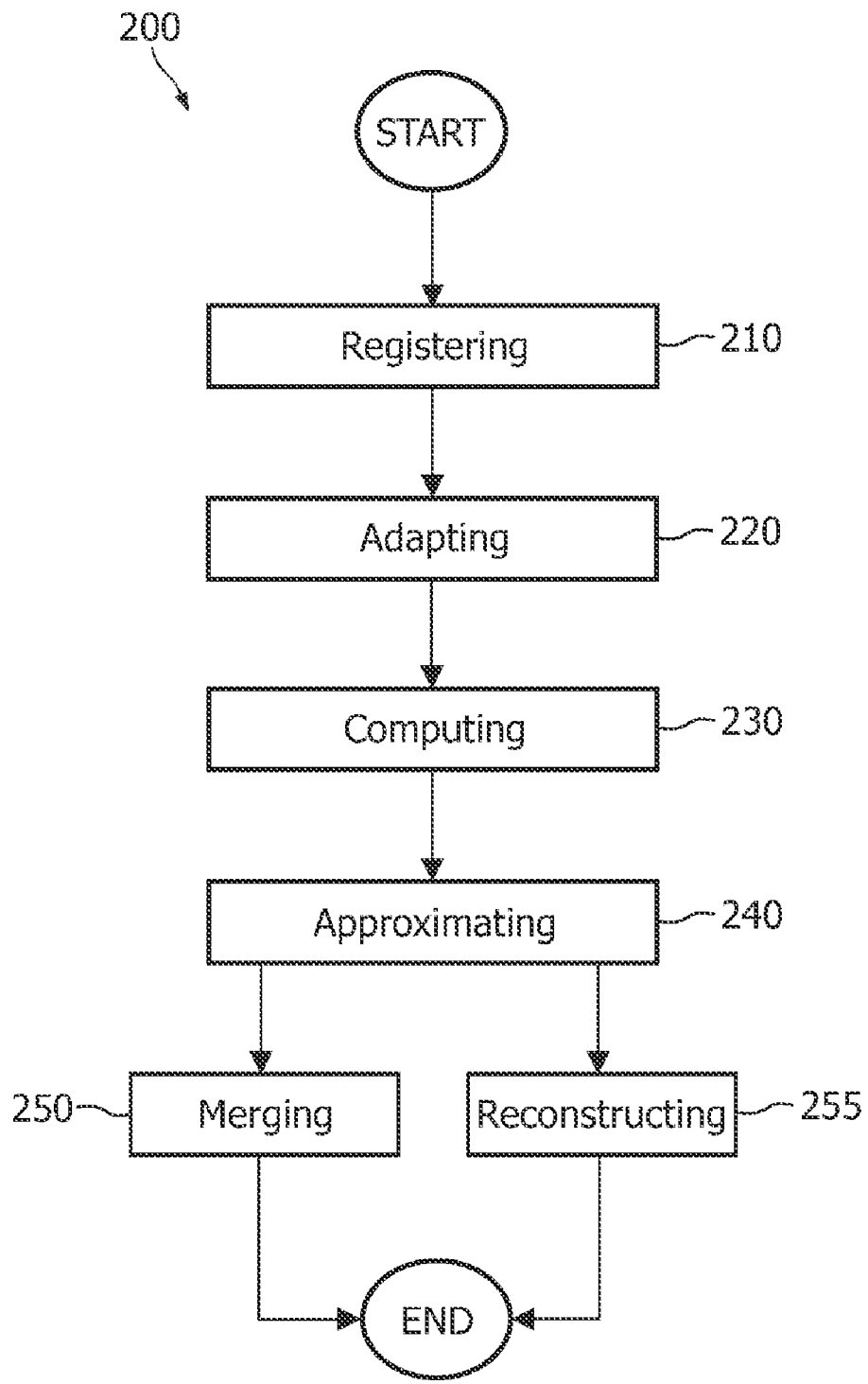
FIG. 2 is a flowchart of an exemplary implementation of the method.

FIG. 2 is a flowchart of an exemplary implementation of the method 200 of adapting a first model mesh to first image data and a second model mesh to second image data. The method begins with a registration step 210 for registering the first model mesh with the first image data and for registering the second model mesh with the second image data on the basis of a computation of a registration transformation for transforming the first model mesh and for transforming the second model mesh. After the registration step 210, the method 200 continues to an adaptation step 220 for adapting the registered first model mesh to the first image data on the basis of a computation of locations of vertices of the first model mesh and for adapting the registered second model mesh to the second image data on the basis of a computation of locations of vertices of the second model mesh. After the adaptation step 220, the method 200 continues to a computation step 230 for computing a sparse vector field comprising vectors of displacements of vertices of the adapted second model mesh relative to respective vertices of the adapted first model mesh. After the computation step 230, the method 200 continues to an approximation step 240 for computing a dense vector field comprising vectors of displacements of locations comprised in the second image data relative to respective locations comprised in the first image data and based on the sparse vector field. Next, the method 200 continues to a merging step 250 for merging the second image data with the first image data using the dense vector field. Alternatively, after the approximation step 240 the method 200 may continue to a reconstruction step 255 for reconstructing motion-compensated image data using the dense vector field. The method 200 terminates after the merging step 250 or after the reconstruction step 255.

The order of steps in the method 200 is not mandatory, the skilled person may change the order of some steps or perform some steps concurrently using threading models, multi-processor systems, or multiple processes without departing from the scope of the present invention. Optionally, two or more steps of the method 200 of the current invention may be combined into one step. Optionally, a step of the method 200 of the current invention may be split into a plurality of steps. Some steps of the method 200 are optional and may be omitted.

Figure 3:
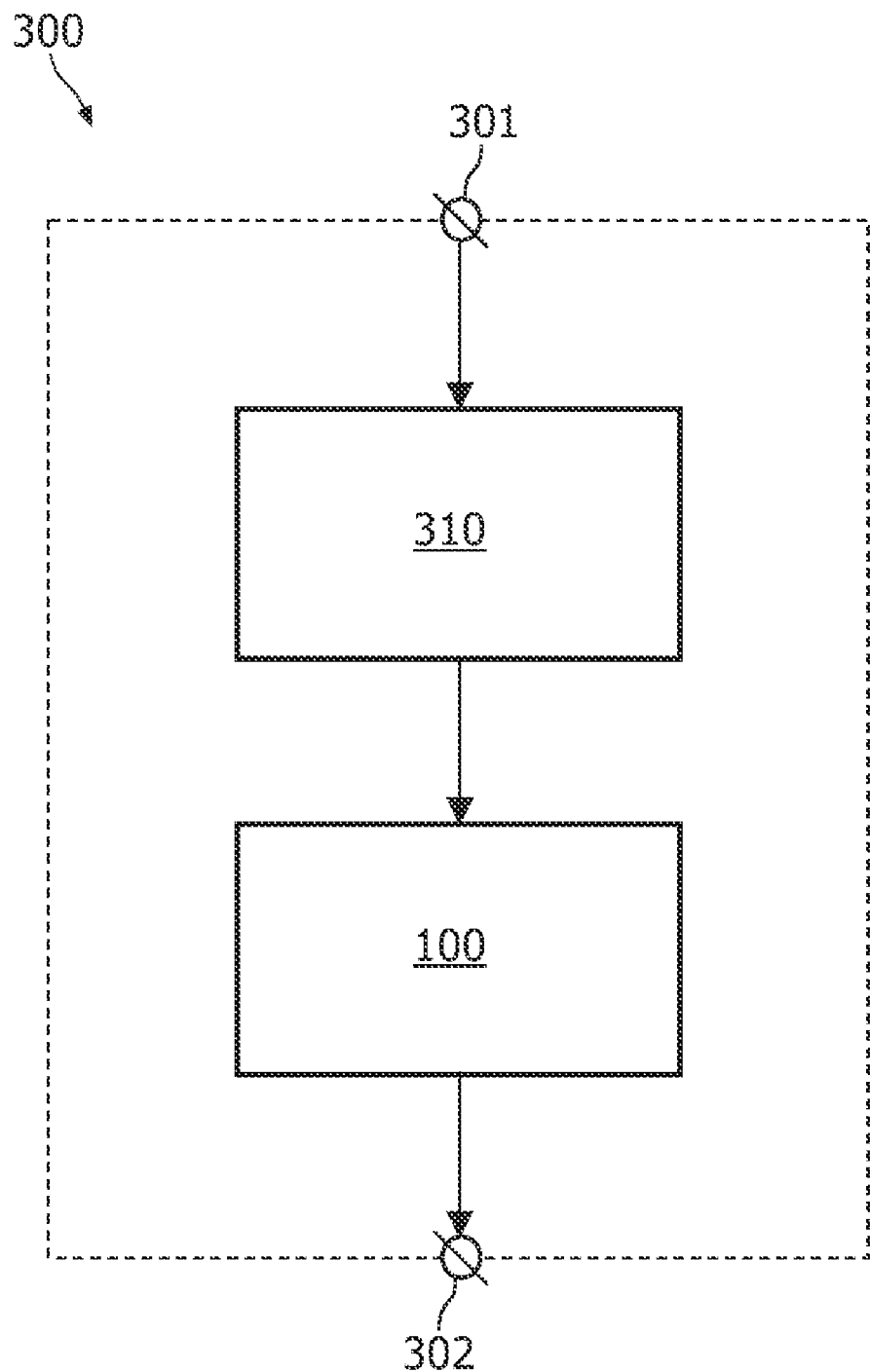
FIG. 3 schematically shows an exemplary embodiment of the image acquisition apparatus.

FIG. 3 schematically shows an exemplary embodiment of the image acquisition apparatus 300 in which the system 100 is used, said image acquisition apparatus 300 comprising an image acquisition unit 310 connected to the system 100 via an internal connection, an input connector 301, and an output connector 302. This arrangement advantageously increases the capabilities of the image acquisition apparatus 300 by providing said image acquisition apparatus 300 with advantageous capabilities of the system 100 for adapting a first model mesh to first image data and for adapting a second model mesh to second image data. Examples of image acquisition apparatuses comprise, but are not limited to, a CT system, an X-ray system, an MRI system, an US system, a PET system, a SPECT system, and a NM system.

Figure 4:
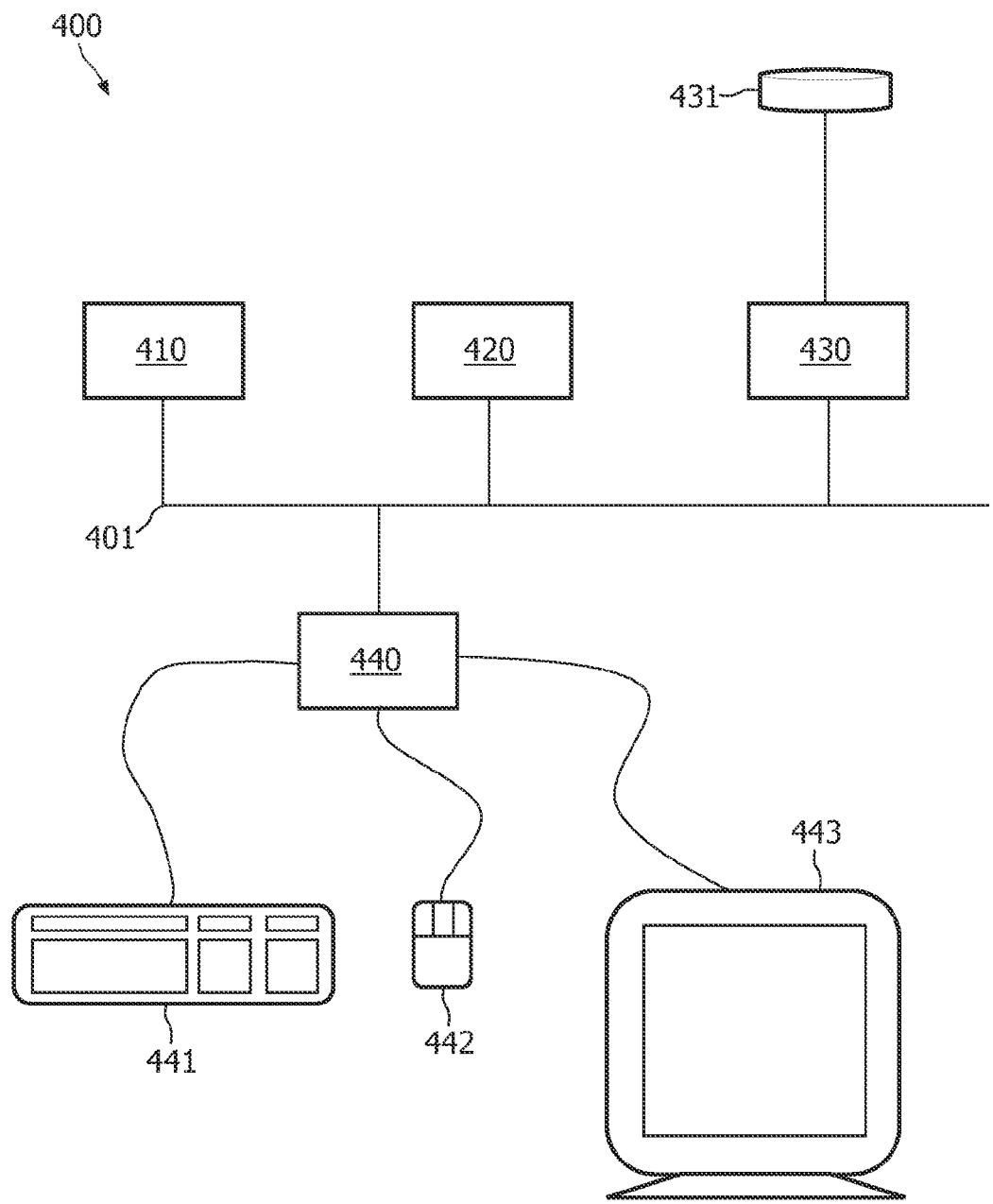
FIG. 4 schematically shows an exemplary embodiment of the workstation.

FIG. 4 schematically shows an exemplary embodiment of the workstation 400. The workstation comprises a system bus 401. A processor 410, a memory 420, a disk input/output (I/O) adapter 430, and a user interface (UI) 440 are operatively connected to the system bus 401. A disk storage device 431 is operatively coupled to the disk I/O adapter 430. A keyboard 441, a mouse 442, and a display 443 are operatively coupled to the UI 440. The system 100 of the invention, implemented as a computer program, is stored in the disk storage device 431. The workstation 400 is arranged to load the program and input data into memory 420 and execute the program on the processor 410. The user can input information to the workstation 400 by means of the keyboard 441 and/or the mouse 442. The workstation is arranged to output information to the display device 443 and/or to the disk 431. The skilled person will understand that there are numerous other embodiments of the workstation 400 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention may be implemented by means of hardware comprising several distinct elements and by means of a programmed computer. In the system claims enumerating several units, several of these units may be embodied by one and the same item of hardware or software. The usage of the words first, second and third, etc. does not indicate any ordering. These words are to be interpreted as names.

The invention claimed is:

1. A system for adapting a first model mesh to first image data and for adapting a second model mesh to second image data, the system comprising:

a registration unit for registering the first model mesh with the first image data and for registering the second model mesh with the second image data based on a computation of a registration transformation for transforming the first model mesh and for transforming the second model mesh; and an adaptation unit for adapting the registered first model mesh to the first image data based on a computation of locations of vertices of the first model mesh and for adapting the registered second model mesh to the second image data based on a computation of locations of vertices of the second model mesh, thereby adapting the first model mesh to the first image data and adapting the second model mesh to the second image data.

2. A system as claimed in claim 1, further comprising a computation unit for computing a sparse vector field comprising vectors of displacement of vertices of the adapted second model mesh relative to respective vertices of the adapted first model mesh.

3. A system as claimed in claim 2, further comprising an approximation unit for computing a dense vector field comprising vectors of displacement of locations comprised in the second image data relative to respective locations comprised in the first image data and based on the sparse vector field.

4. A system as claimed in claim 3, further comprising a merge unit for merging the second image data with the first image data using the dense vector field, thereby creating merged image data.

5. A system as claimed in claim 3, further comprising a reconstruction unit for reconstructing motion-compensated image data using the dense vector field.

6. A system as claimed in claim 1, wherein the first model mesh is a first heart model mesh at a first cardiac cycle phase and the second model mesh is a second heart-model mesh at a second cardiac cycle phase.

7. A system as claimed in claim 1, wherein the registration transformation is an affine transformation.

8. An image acquisition apparatus comprising the system as claimed in claim 1.

9. A workstation comprising the system as claimed in claim 1.

10. A method of adapting a first model mesh to first image data and a second model mesh to second image data, the method comprising:

registering with a processor the first model mesh with the first image data and for registering the second model mesh with the second image data based on a computation of a registration transformation for transforming the first model mesh and for transforming the second model mesh; and adapting with the processor the registered first model mesh to the first image data based on a computation of locations of vertices of the first model mesh and for adapting the registered second model mesh to the second image data based on a computation of locations of vertices of the second model mesh, thereby adapting the first model mesh to the first image data and adapting the second model mesh to the second image data.

11. The method of claim 10, wherein the registration transformation is computed based on a total energy function comprising an internal energy tern and an external energy term.

12. The method of claim 10, wherein the registration transformation is selected from a class of rigid transformations specified by six independent parameters.

13. The method of claim 10, wherein the locations of the vertices of the first model mesh correspond to a minimum of a cost function.

14. A computer program product to be loaded by a computer arrangement and stored in a storage device, comprising instructions for adapting a first model mesh to first image data and for adapting a second model mesh to second image data, the computer arrangement comprising a processing unit and a memory, the computer program product, after being loaded, providing said processing unit with the capability to carry out the tasks of:

registering the first model mesh with the first image data and for registering the second model mesh with the second image data based on a computation of a registration transformation for transforming the first model mesh and for transforming the second model mesh; and adapting the registered first model mesh to the first image data based on a computation of locations of vertices of the first model mesh and for adapting the registered second model mesh to the second image data based on a computation of locations of vertices of the second model mesh, thereby adapting the first model mesh to the first image data and adapting the second model mesh to the second image data.

15. The computer program product of claim 14, wherein the adapting is based on varying the locations of the vertices of the first model mesh and the second model mesh to minimize total energy.

16. The computer program product of claim 14, wherein said processing unit has the capability to compute a sparse vector field comprising vectors of displacement of vertices of the adapted second model mesh relative to respective vertices of the adapted first model mesh.

17. The computer program product of claim 14, wherein the first model mesh is a first heart model mesh at a first cardiac cycle phase and the second model mesh is a second heart-model mesh at a second cardiac cycle phase.

18. The computer program product of claim 14, wherein the registration transformation is an affine transformation.

19. The computer program product of claim 14, wherein said processing unit has the capability to compute a dense vector field comprising vectors of displacement of locations comprised in the second image data relative to respective locations comprised in the first image data and based on the sparse vector field.

20. The computer program product of claim 19, wherein said processing unit has the capability to reconstruct motion-compensated image data using the dense vector field.

* * * * *